United States Patent [19]

Ohishi

[11] Patent Number: 4,575,366
[45] Date of Patent: Mar. 11, 1986

[54] TENSION MECHANISM FOR αBELT DRIVE APPARATUS

[75] Inventor: Yoshiyuki Ohishi, Tokyo, Japan

[73] Assignee: Citizen Watch Co., Ltd., Tokyo, Japan

[21] Appl. No.: 711,462

[22] Filed: Mar. 13, 1985

[30] Foreign Application Priority Data

Mar. 19, 1984 [JP] Japan ............................. 59-40330[U]

[51] Int. Cl.$^4$ .......................................... F16H 7/08
[52] U.S. Cl. ...................................... 474/101; 474/128
[58] Field of Search .............. 474/101, 102, 105, 109, 474/111, 112, 119–123, 128–130

[56] References Cited

U.S. PATENT DOCUMENTS

| 305,775 | 9/1884 | Allen | 474/129 X |
| 888,998 | 5/1908 | Gould | 474/128 X |
| 927,222 | 7/1909 | Carlton | 474/128 X |
| 1,357,881 | 11/1920 | Loose | 474/128 |
| 2,921,754 | 1/1960 | Tolkin | 474/128 X |

Primary Examiner—Stephen J. Novosad
Assistant Examiner—Thuy M. Bui
Attorney, Agent, or Firm—Koda and Androlia

[57] ABSTRACT

A tension mechanism for an αbelt drive apparatus comprising an αbelt which is wound around a drive pulley, the one end of which is fixed to a carriage and the end of which is formed an engaging portion, and a lever which is rotatingly and pivotally supported on the part of the carriage and forms a short hand portion having a stopper on its tip end to engage with the engaging portion and a long hand portion being urged on its tip end to be stopped at the part of the carriage.

The lever above mentioned is rotated and stopped on its tip end of the long hand portion at the part of the carriage so that the αbelt can be applied a tension force.

4 Claims, 4 Drawing Figures

TENSION MECHANISM FOR α BELT DRIVE APPARATUS

BACKGROUND OF THE INVENTION

1. Field of the Invention

The present invention relates to a tension mechanism for an α belt drive apparatus which is spanned along a carriage in order to drive this by a drive pulley.

2. Description of the Prior Art

An α belt has been utilized as a carriage feeding belt to slide a carriage along a frame carrying a head which makes contact with a disk such as a micro-floppy disk or the like to perform read/write of data since the α belt provides a positive travel of the carriage in a limited space and is capable of designing a small size apparatus.

The carriage includes a belt receiving portion which connects two ends of the α belt being wound around the drive pulley, the rotation of which is converted into reciprocating motion of the carriage by the α belt.

In order to have the α belt to be properly spanned over the carriage a tension force must be applied to one side of the belt at least. In the prior art, as shown in FIG. 1, the one end of the α belt 14 is fixed to the carriage 10 with winding around the drive pulley 12, and the other end of the α belt 14 is connected with the carriage 10 via a coil spring 16. On the other hand, as shown in FIG. 2, a tension spring with U-shape is provided in stead of the coil spring 16 mentioned above. The coil spring 16 or the tension spring 18 are applied as the tension force so that the α belt 14 can be properly spanned over the carriage 10.

In the prior art device as is mentioned in the above, however, it is hard for the α belt 14 to be assembled with the carriage 10 since the spring member of the coil spring 16, the tension spring or the like is connectedly provided together with the α belt 14.

SUMMARY OF THE INVENTION

In view of the problem in the prior art, it is therefore an object of the present invention to provide a tension mechanism for an α belt drive apparatus which can be easily assembled with a carriage, and applied an appropriate tension force to be properly spanned over the carriage.

In keeping with the principles of the present invention, the object is accomplished with a tension mechanism for an α belt drive apparatus including an α belt which is wound around a drive pulley, the one end of which is fixed to a carriage and the other end of which is formed an engaging portion, and a lever which is rotatingly and pivotally supported on the part of the carriage and forms a short hand portion having a stopper on its tip end to engage with the engaging portion and a long hand portion being urged on its tip end to be stopped at the part of the carriage, wherein the lever is rotated and stopped on its tip end of the long hand portion at the part of the carriage so that the α belt can be applied a tension force.

DETAILED DESCRIPTION OF THE EMBODIMENT

Figure 1:
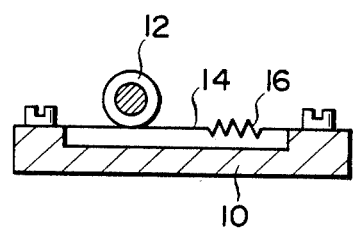
FIGS. 1 and 2 are illustrations describing examples of tension mechanisms for an α belt drive apparatus in the prior art.
Figure 2:
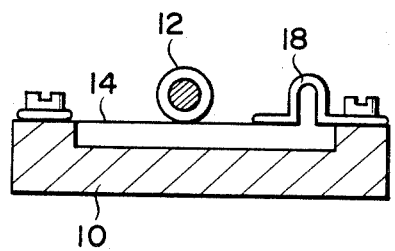
Figure 3:
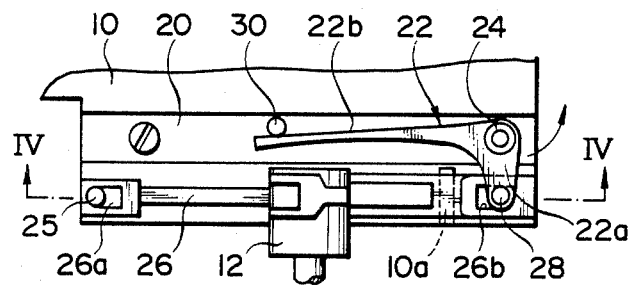
FIG. 3 is an illustration describing a preferred embodiment of the present invention.
Figure 4:
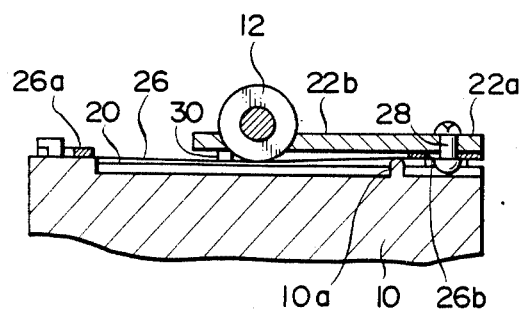
FIG. 4 is a sectional view taken on line IV—IV of FIG. 3.

In FIGS. 3 and 4 a reinforcing plate 20 is fixed to a carriage 10 by spot welding or the like, and a substantially L-shaped lever 22 is rotatingly supported by a shaft 24 projected from the reinforcing plate 20 as its axis.

On the other hand, a pin 25 is standingly provided on the carriage 10 so that the one end 26a of the α belt 26 can be detachably hooked thereon, and further, a hole 26b is formed on the other end of the α belt 26 as an engaging portion.

In the hole 26b engaged therein is a pin 28 as a stopper provided on the tip end of a short hand portion 22a of the lever 22 mentioned above by caulking or the like. In this state, a long hand portion 22b is rotatingly moved to the counter-clockwise direction and the short hand portion 22a is also moved to apply a tension force to the α belt. In such a state that the α belt is properly spanned over the carriage by the tension force applied as mentioned above, the tip end of the long hand portion 22b is stopped at a stop pin 30 provided on the reinforcing plate 20.

Furthermore, as shown in FIG. 4 a projected portion 10a is formed with the carriage 10 so that the α belt 26 can make contact with the portion 10a, and the α belt 26 is urged upward at this area where it makes contact with the projected portion 10a. Since this projected portion 10a works as a stabilizer to stop carrying the unsteady movement of the lever 22 along to the pulley 12, the α belt 26 can be easily established its attached position and simply assembled around the pulley 12.

As mentioned hereinabove, since the tension force to the α belt 26 is applied by the rotation of the lever 22 which is separately provided from the α belt 26, the α belt 26 is also built in the carriage 10 with extreme ease.

In this embodiment, on the reinforcing plate 20 are provided the shaft 24 and the stop pin 30 of the rotary shaft 22, but it is also possible for them to be established directly on the carriage 10.

Furthermore, it is also possible to easily adjust the respective feed shafts of the α belt 26 and the carriage 10 when the reinforcing plate 20 is not welded on to the carriage 10 in the beginning but provided separately from this, and is adjustably positioned on the carriage 10 after the α belt 26 is attached on to the reinforcing plate 20.

As described heretofore, according to the present invention, the rotation of the lever provided separately from the α belt applies the tension force to the α belt, and the α belt can be assembled with the carriage with extreme ease.

What is claimed is:

1. A tension mechanism for an α belt drive apparatus comprising:

an α belt which is wound around a drive pulley, the one end of which is fixed to a carriage and the other end of which is formed an engaging portion; and a lever which is rotatingly and pivotally supported on the part of the carriage, and forms a short hand portion having a stopper on its tip end to engage with said engaging portion and a long hand portion being urged on its tip end to be stopped at the part of the carriage, wherein said lever is rotated and stopped on its tip end of said long hand portion at the part of the carriage so that said α belt can be applied a tension force.

2. A tension mechanism for an α belt drive apparatus according to claim 1 wherein a projected portion is formed with the part of the carriage for stabilizing the α belt to suppress the unsteady movement at this portion.

3. A tension mechanism for an α belt drive apparatus according to claims 1 or 2 wherein, at least one end of the α belt is detachably hooked on a pin provided on the part of the carriage or the lever.

4. A tension mechanism for an α belt drive apparatus according to claims 1 or 2 wherein the lever is composed of substantial L-shape.

* * * * *